Oct. 23, 1956  W. H. DU SHANE  2,767,594
ENGINE CONTROL
Filed July 13, 1955
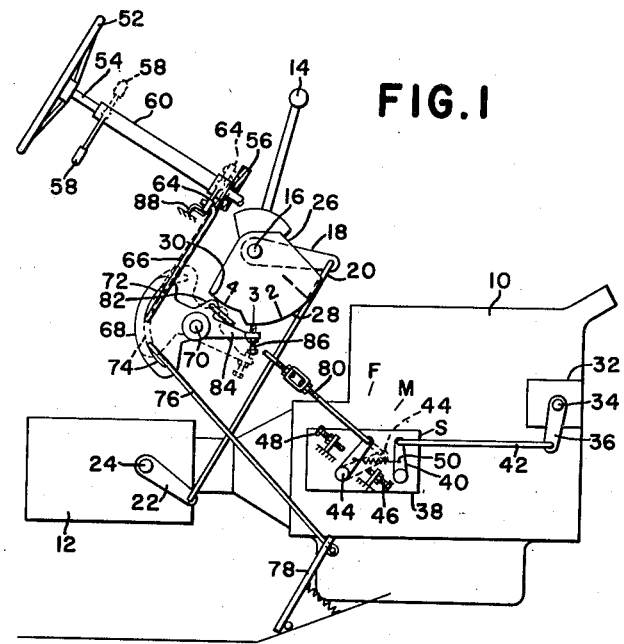
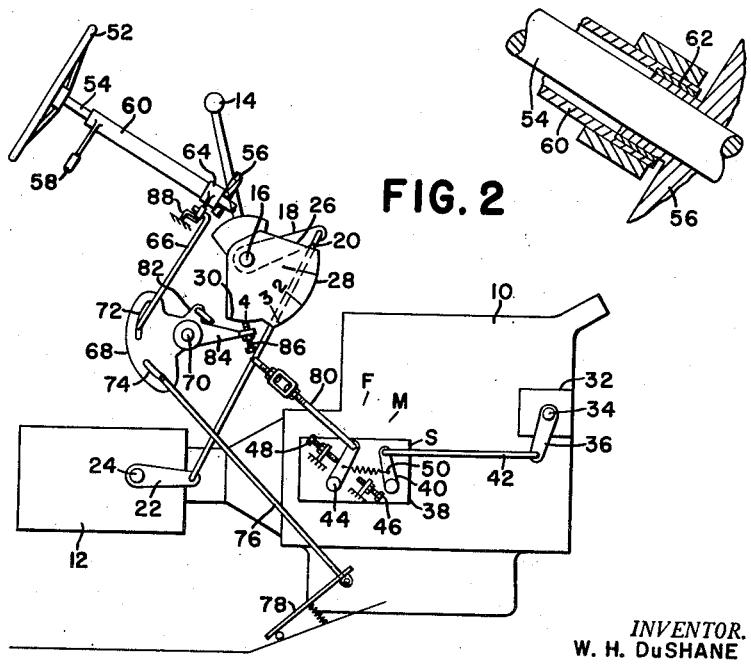
INVENTOR.
W. H. DuSHANE

United States Patent Office 2,767,594
Patented Oct. 23, 1956

2,767,594
ENGINE CONTROL
Wallace H. Du Shane, Waterloo, Iowa, assignor to Deere Manufacturing Co., Dubuque, Iowa, a corporation of Iowa Application July 13, 1955, Serial No. 521,780

10 Claims. (Cl. 74—472)

This invention relates to a control system for the internal combustion engine of a vehicle. More particularly, the control system involves the provision of dual control members for regulating the speed of the engine and is especially adapted for use in an agricultural tractor.

In the conventional tractor, substantially constant speed under varying load is obtained by the use of a speed-regulating device such as a governor which is associated in any typical manner with a carburetor or any other suitable control means. The ground speeds of a tractor are relatively low and are varied by a change-speed transmission. Normally, hand control of the speed-regulating device is sufficient. However, in those cases in which the tractor transmission has what is known as a transport gear, which is used when the tractor is driven on the highway or roads of an equivalent nature, it is desirable that the engine speed be controlled by an accelerator or foot feed so that operation of the tractor in its transport gear will be very much like that of the conventional automobile.

According to the present invention, an improved dual control, involving a hand control element and a foot control element, is arranged with a speed-regulating device so as to permit control of that device by either of the elements. The control system features means for limiting speed-increase regulation of the regulating device between slow and intermediate speed positions when the tractor is operating in low or intermediate gears. This arrangement prevents use of either the hand control element or the foot control element beyond a certain range and therefore avoids overspeeding of the engine beyond rated engine speed during field-working conditions. It is a further feature of the invention, however, to make the foot feed available to obtain faster engine speeds but only when the tractor transmission is in its transport gear. Limit means is provided for limiting movement of the hand control element to a range corresponding to the slow and intermediate speed positions of the regulating device. Either the hand control or the foot feed can over-ride the other within the limits defined by the slow and intermediate engine speeds.

The foregoing and other important objects and desirable features inherent in and encompassed by the invention will become apparent as a preferred embodiment thereof is disclosed in detail in the ensuing specification and accompanying drawings, the several figures of which are described immediately below.

Fig. 1 is a schematic view of the control system, showing, in full lines, operation of the engine and tractor at a medium or intermediate speed and illustrating in dotted lines the positions of the parts in the slow speed position of the regulating device or governor.

Fig. 2 is a similar schematic view showing high or fast speed operation in transport gear.

Fig. 3 is an enlarged sectional view showing the mounting of the hand control tube relative to the steering shaft of the vehicle.

Only a sufficient portion of a vehicle and related components required for the present disclosure are illustrated. A typical internal combustion engine is shown at 10 and rearwardly of this engine and connected thereto by suitable clutch means (not shown) is a change-speed transmission 12 under control of shifter means including a shift lever 14, a vehicle mounted rockshaft 16, a rockshaft arm 18, a link 20, a second arm 22 and a transmission-mounted rockshaft 24. The particular type of transmission is not important. The present disclosure is based upon the use of a transmission such as that forming the subject matter of the Du Shane and Rugent Patent 2,710,546. Such transmission has a plurality of speed ratios, certain of which are in low and intermediate ranges, such as first, second and third, and at least one of which is in a high range, such as a transport or fourth gear. The rockshaft 16 has fixed thereto a bi-positionable stop 26 which is in the form of a cam having first and second or high and low portions 28 and 30. The transmission speeds or gear ratios are indicated on the sector or cam by the numerals 1, 2, 3 and 4.

Selective fore-and-aft movement of the shift lever 14 selects the indicated transmission speed by rocking the rockshaft 24 which is, interiorly of the transmission 12, connected to any suitable means for changing gear ratios. The particular type of shift means is not significant, although, it should preferably be one in which the speed ratios can be obtained in the sequence noted. The high portion 28 of the cam or bi-positional stop 26 is angularly coextensive with the range of movement of the cam in which first, second and third gears are selected in the transmission. For the purposes of the present disclosure, these ratios may be considered low and intermediate transmission speeds. The low portion 30 of the cam or stop is coincident with the fourth speed position of the shift lever and this fourth speed may be considered a high transmission ratio or speed.

The engine is equipped with fuel control means, which may be either a carburetor or fuel injection means, the details of neither of which are important here. A representative means is shown at 32 as having a rockshaft 34 (which may be a throttle shaft, for example) to which an arm 36 is fixed. The arm 36 is controlled by a speed-regulating device 38, which may be considered typical of any suitable governor. The governor has a speed control arm 40, movable according to the action of the governor, and connected by a link 42 to the fuel control means arm 36. The governor further has a regulating part in the form of an angularly movable arm 44 operative in an angular range including slow, intermediate and fast speed positions in that order. These positions are designated in the drawings respectively by the letters S, M and F. In a representative installation, the slow or "S" position of the part 44 may be what is called a slow idle position. Minor variations for this position may be accomplished by adjusting means shown schematically at 46. The intermediate or "M" position produces rated engine speed for operation under field conditions. Means for adjusting or varying this position within a limited range will be described later. The fast position may be varied within a limited range by other adjusting means such as that shown schematically at 48. A spring 50 interconnects the arms 40 and 44 so that changes in position of the arm 44 have the necessary effect on the arm 40, all as is well known.

The vehicle is shown as including a steering wheel 52 mounted on a steering shaft 54 that is journaled in any appropriate manner on a support 56. A hand control element, in the form of a lever 58, is mounted on a control tube 60 which is rotatable relative to the steering shaft 54. The lower interior end of the tube 60 includes friction means 62 which operates to releasably retain any selected angular position of the tube when the tube is turned by the lever 58. The arrangement is such that rotation of the steering shaft 54 has no effect on the tube 60.

The lower end of the hand control element tube 60 has rigidly secured thereto a radially extending arm 64 and this arm is connected by a force-transmitting connection or link 66 to an intermediary member 68. This member is rockable about a pivot 70 through a range corresponding to the range of movement of the regulating part or arm 44 between S and F. The force-transmitting connection, including the link 66 to the member 68, includes a lost motion device, here in the form of an elongated arcuate slot 72. A second arcuate slot 74, spaced angularly or circumferentially from the slot 72, affords a lost-motion means or device in a second force-transmitting connection or link 76 to a foot control element or accelerator pedal 78. This pedal is typically pivoted to the vehicle floor board and is biased for return to a starting position. By means of the force-transmitting connections, the intermediary member 68 is under the dual control of the hand lever 58 or pedal 78. The provision of the slots 72 and 74 enables one element to over-ride the other in certain circumstances. Connection of the intermediary member 68 to the regulating part or arm 44 is effected by an adjustable link 80, connected at one end to the arm 44 and at its other end to an arm 82 movable in unison with the intermediary member 68. Another arm 84, rigid on the member 68, carries adjustable means 86 for effecting interengagement between the member 68 and the bi-positionable stop or cam 26, according to the position of the shift lever 14 and therefore according to the selected transmission speed.

A fixed stop 88 limits the range of movement of the hand control arm 64 in a speed-increase direction. As will be brought out below, the range of the hand control element, as fixed by the stop 88, is substantially coextensive with the range of movement of the regulating part between its S and M positions.

Operation

Fig. 1, on the basis of the dotted line positions of the parts 58, 64, 68 and 44, represents the slow idle or "S" speed of the engine. Although the position of the cam or stop 26 reflects selection of third speed in the transmission 12, it may be assumed, at least for present purposes, that the clutch between the engine and the transmission is disengaged, or it can be assumed that the clutch is engaged and that the load conditions under which the tractor is to operate will be satisfied by slow idle adjustment of the engine speed and third gear in the transmission. In any event, the hand control link 66 is at or near the bottom end of the upper slot 72 and the foot control link 76 is at or near the bottom of the lower slot 74. As long as the selector means established by the shift lever 14 is in a position reflecting first, second or third gear in the transmission, the high portion of the stop or cam 26 will be presented to the path of arcuate movement of the adjustable means 86 on the intermediary member arm 84. Hence, movement of the intermediary member 68 from the dotted line position to the full line position is limited to a range substantially coextensive with the S—M range of the regulating part 44. Therefore, regardless of whether the intermediary member is moved by the hand control element 58 or foot control element 78, it cannot cause the regulating part 44 to exceed its M position. Consequently, the operator cannot over-speed the engine in the low and intermediate transmission speeds.

In this phase of operation, either element 58 or 78 may be used to control the member 68, and either can over-ride the other. As already stated, the limit on the range of the element 58 is fixed by the stop 88 to a maximum position rendering it impossible for the element 58 to cause the regulating part 44 to exceed its M position. This is true regardless of the position of the cam 26. The interengagement between the cam or stop 26 and the means 86 on the member 68 therefore constitutes means for preventing the use of the foot control element 78 for overspeeding the engine in low and intermediate transmission speeds.

As shown in Fig. 2, wherein the selector means or shift lever 14 has selected fourth or transport gear in the transmission 12, the limitation effected by the high portion 28 of the cam or stop 26 is removed, and the low portion 30 of the cam is presented to the means 86 on the member 68. Therefore, the range of movement of the member 68 is increased so that it is now coextensive with the full range (S—F) of the regulating part 44. Movement of the member 68 through this additional or increased range can be accomplished only by the foot feed 78, because the stop 88 limits the movement of the element 58 to the limited range S—M. This is consistent with the operation of the vehicle at relatively high speeds for transport purposes, since it is more convenient to control the vehicle by a foot feed at these speeds, thus approximating the control of the conventional automobile.

The arrangement provides several advantages in adjustment. For example, with the hand control lever 58 moved in a clockwise direction (as viewed by an operator behind the steering wheel 52) so that the arm 64 contacts the fixed stop 88, and with the cam or stop 26 in any one of its several positions so that the high portion 28 thereof is presented to the adjusting means 86, the adjusting means is screwed out so that it does not touch the portion 28. The link 80 is then adjusted to produce a fast idle engine speed (for rated or working speed), according to that specified by the manufacturer. This adjustment should be slightly higher than that specified. Next, with the cam 26 in the position just described, the adjustment at 86 is made to reduce the engine speed to the specified rated fast idle engine speed.

To adjust for transport speed, the cam 26 is moved so that the low portion 30 is presented to the adjusting means 86 and the foot feed 78 is depressed to move the regulating part 44 to its F position. Adjustment is effected at 48 to give the specified transport engine speed.

To obtain the specified slow idle engine speed, the hand control lever 58 is moved to the dotted line position of Fig. 1, which allows the regulating part 44 to move against the adjustable stop 46. Adjustment is then effected at 46 for the purpose already indicated. This adjustment is only to prevent the engine from stopping when the throttle is retarded and could in fact be on the means 32.

With the parts as shown in full lines in Fig. 1, the intermediary member 68 has attained its maximum position as determined by engagement between 86 and 28. Depression of the pedal 78 will have no effect, since the link 76 will merely slide in the slot 74. In other words, the foot feed 78 is ineffective to increase engine speed at any time as long as the stops are effective at 64—88 and 28—86. If the hand control lever is retarded (moved counterclockwise as viewed by the operator), the governor or regulating part 44 will move toward its S position. In these circumstances, depression of the foot pedal 78 will bring the engine speed up to M or rated working speed.

When the parts are in the positions shown in Fig. 2, with the transmission operating in transport or fourth gear, tractor speed can be varied by the foot feed 78, as engine speed is varied between M and F. The M position is determined by engagement between the hand lever arm 64 and fixed stop 88. In a range short of this, both the foot feed and the hand control can modify engine speed in fourth or transport gear.

Various features of the invention, not categorically enumerated herein, will undoubtedly occur to those versed in the art, as will many modifications and alterations in of which may be achieved without departing from the spirit and scope of the invention.

What is claimed is:

1. Control mechanism for a vehicle having an engine, a speed-regulating device for the engine including a regulating part movable through a range including slow, intermediate and fast speed positions in that order, and a change-speed transmission including selector means for selecting high and low transmission speeds, said mechanism comprising: an intermediary member connected to and movable in unison with the regulating part; a stop selectively positionable in first and second positions, said stop in its first position engaging the member to confine speed-increase movement of the member and part to the intermediate speed position, said stop in its second position releasing the member to enable full-range movement of said member and part; means interconnecting the stop and the selector means for positioning the stop in its first and second positions in response to the selection, respectively, of low and high transmission speeds; and means for moving the intermediary member.

2. The invention defined in claim 1, including: first and second adjustable abutment means individually engageable with the regulating part for respectively varying the slow and fast speed positions thereof; and third adjustable means on the intermediary member and cooperative with the stop to adjust the member and accordingly to vary the intermediate speed position of the regulating part.

3. The invention defined in claim 1, in which the means for moving the member comprises: first and second independently movable control elements; first and second force-transmitting means respectively connecting the elements to the member for moving the member; and each force-transmitting means including a lost-motion device enabling movement of the member by one element independently of the other.

4. The inveniton defined in claim 3, including: limit means engageable with one element to limit speed-increase movement thereof to a position corresponding substantially to the intermediate position of the regulating part.

5. The invention defined in claim 3, in which: one element is a hand control lever and the other element is a pedal.

6. Control mechanism for a vehicle having an engine, a speed-regulating device for the engine including a regulating part movable through a range including slow, intermediate and fast speed positions in that order, and a change-speed transmission, said mechanism comprising: an intermediary member connected to and movable in unison with the regulating part; a stop selectively positionable in first and second positions, said stop in its first position engaging the member to confine speed-increase movement of the member and part to the intermediate speed position, said stop in its second position releasing the member to enable full-range movement of said member and part; means interconnecting the stop and the transmission for positioning the stop in its first and second positions in response to the operation of the transmission respectively in low and high speeds; and means for moving the intermediary member.

7. Control mechanism for a vehicle having an engine, a speed-regulating device for the engine including a regulating part movable through a range including slow, intermediate and fast speed positions in that order, and a change-speed transmission including selector means for selecting high, intermediate and low transmission speeds, said mechanism comprising: an intermediary member connected to and movable in unison with the regulating part; a stop selectively positionable in first and second positions, said stop in its first position engaging the member to confine speed-increase movement of the member and part to the intermediate speed position, said stop in its second position releasing the member to enable full- range movement of said member and part; means interconnecting the stop and the selector means for positioning the stop in its first position when the selector means selects low and intermediate speeds and for positioning the stop in its second position when the selector means selects the high transmission speed.

8. The invention defined in claim 7, including: adjustable means cooperative between the stop and the intermediary member for varying the engagement status therebetween to vary the intermediate speed position of the regulating part.

9. Control mechanism for a vehicle having an engine, a speed-regulating device for the engine including a regulating part movable through a range including slow, intermediate and fast speed positions in that order, and a change-speed transmission including selector means for selecting high and low transmission speeds, said mechanism comprising: a foot control element movable through a full range corresponding to the full range of the regulating part; a first force-transmitting connection between the foot control element and the regulating part for element-control of said part, said connection including bidirectional lost-motion means enabling limited relative movement between said element and part; a hand control element movable through a limited range corresponding to that portion of the regulating part range between its slow and intermediate speed position; a second force-transmitting connection from the hand control element to the regulating part for effecting limited range movement of the latter by the former, said connection including bi-directional lost-motion means enabling limited relative movement between said hand control element and said part to permit full range movement of the foot control element; and means interconnecting the foot control element and the selector means and operative in response to selector-means-selection of a low transmission speed to limit movement of the foot control element to a reduced range corresponding to that portion of the regulating part range between its slow and intermediate positions.

10. Control mechanism for a vehicle having an engine, a speed-regulating device for the engine including a regulating part movable through a range including slow, intermediate and fast speed positions in that order, and a change-speed transmission including selector means for selecting high, intermediate and low transmission speeds, said mechanism comprising: a foot control element movable through a full range corresponding to the full range of the regulating part; a first force-transmitting connection between the foot control element and the regulating part for element-control of said part, said connection including bi-directional lost-motion means enabling limited relative movement between said element and part; a hand control element movable through a limited range corresponding to that portion of the regulating part range between its slow and intermediate speed position; a second force-transmitting connection from the hand control element to the regulating part for effecting limited range movement of the latter by the former, said connection including bi-directional lost-motion means enabling limited relative movement between said hand control element and said part to permit full range movement of the foot control element; and means interconnecting the foot control element and the selector means and operative in response to selector-means-selection of and intermediate speeds to limit movement of the foot control element to a reduced range corresponding to that portion of the regulating part range between its slow and intermediate positions.

References Cited in the file of this patent

UNITED STATES PATENTS

| | | |
|---|---|---|
| 2,118,730 | Kalbreier | May 24, 1938 |
| 2,443,084 | Rhodes | June 8, 1948 |